Patented Aug. 25, 1931

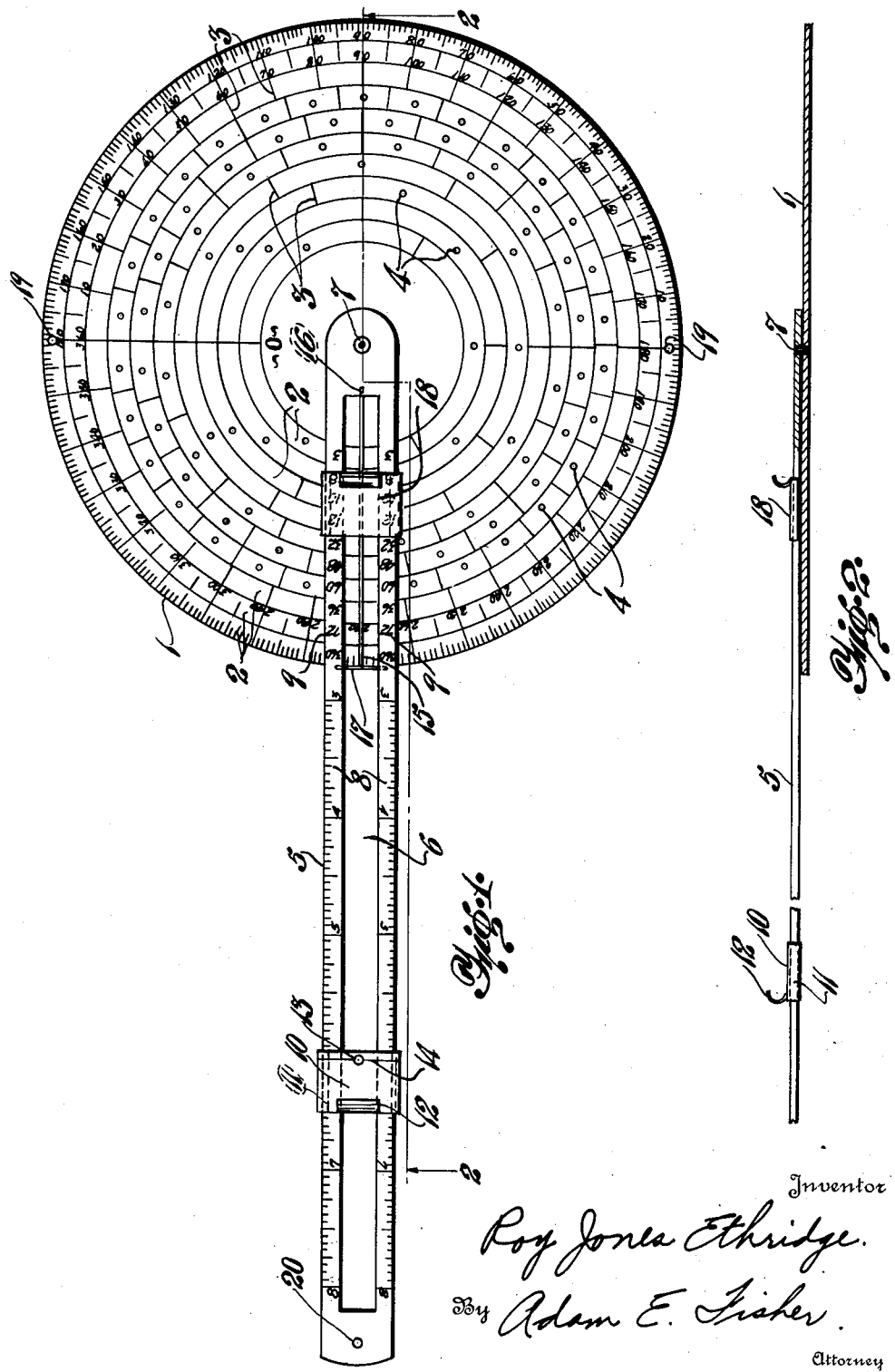

1,820,128

UNITED STATES PATENT OFFICE

ROY JONES ETHRIDGE, OF SAN ANTONIO, TEXAS

PROTRACTOR

Application filed July 17, 1929. Serial No. 378,855.

This invention relates to improvements in protractors and the main object is to provide a protractor embodying a circular plate bearing a plurality of concentric differently divided scales, a scale bearing arm pivotally attached to this plate and a marker receiving slide upon this arm whereby the device may be used to divide a circle into any number of parts, to measure and describe angles, to measure and describe circles and arcs thereof and for various other uses.

Another object is to provide such a device in a simple durable and efficient form.

With these and other objects in view the invention resides in the novel construction and arrangement of parts as hereinafter set forth and claimed.

In the drawings:

Figure 1 is a plan view of a protractor constructed in accordance with my invention.

Figure 2 is a section along the line 2—2 in Figure 1.

In carrying out the invention I provide a circular, flat protractor plate 1 preferably, though not necessarily, formed of celluloid or some similar transparent material, the said plate 1 bearing a plurality of concentric scales 2, the outer one of which is graduated in degrees in the usual manner and the remainder of which are each divided into a different number of parts both by the usual scale marks 3 and by the dots or apertures 4. By virtue of this division of the scales by the marks 3 and dots 4 each scale may be used in dividing a circle in either one or two different numbers of parts according to whether the scale marks are used alone or together with the said dots as will be understood.

An elongated arm 5 also of celluloid or the like having a medial, longitudinal slot 6 is pivoted by a tubular rivet 7 to the center of the protractor plate 1, the said arm extending radially beyond the outer periphery of the said plate 1 as shown. Any convenient sharp pointed instrument (not shown) may be inserted through the bore of the said tubular rivet 7 to hold the protractor plate in the correct position upon the paper or other work. The margins of the arm 5 upon that part of the arm which extends beyond the protractor plate 1 are provided with the scales 8 graduated in inches and fractions thereof. The margins of the arm 5 also carry the numerals denoted generally at 9 which overlie the scales 2 upon the protractor plate 1 and indicate the number of divisions in each of these scales. A carrier or slide 10 is provided, the same having its edge portions 11 bent loosely around the margins of the arm 5 and having a finger piece 12 by means of which it may be reciprocated upon the said arm. A marker receiving aperture 13 is provided in the carrier 10 and a center line 14 is provided across the carrier in alignment with this aperture 13 to facilitate the adjustment of the carrier to any desired point upon the arm 5, the said carrier preferably being made of some transparent material to permit the sight of the scales 8 through it as will be understood. Obviously a circle or arc thereof may be drawn by inserting a pencil point or other marking device (not shown) through the aperture 13 and swinging the arm 5 about its pivotal point 7. An indicating wire 15 is disposed medially and longitudinally in the slot 6 in the arm 5 to indicate the setting of the said arm upon the scales 2. The said wire 15 is secured at one end 16 in the inner end of the slot 6 and the other end is held in place by a cross wire 17 secured in the sides of the slot 6 as shown. 18 denotes an indicating slide similar in construction to the carrier or slide 10, this slide 18 in use being adjusted on the arm until its edge just overlies the scale 2 being used to facilitate the following of the proper scale with the eye as the arm 5 is swung from place to place over the plate 1 as will be understood.

As hereinbefore pointed out the protractor may be used to describe circles and arcs and it has further uses to divide a circle into any desired number of parts, to determine the number of degrees in any part of a circle, and for measuring or describing angles as will be understood. Also it has other uses which make it a handy tool for carpenters and the like as will be understood. As an example it may be used to determine the height of a building by supporting the plate 1 upon a movable vertical stand (not shown) with the attaching or supporting apertures 19 in the plate 1 in vertical alignment and with the arm 5 disposed at an angle of 45 degrees above the horizontal and directed toward the building. Small sighting pegs (not shown) may be inserted in the rivet 7 and in an aperture 20 in the end of the arm 5. The stand is then moved toward or away from the building until a sight along the pegs in the rivet 7 and aperture 20 just strikes the top of the said building. The distances from the rivet 7 vertically to the ground and from this point on the ground to the base of the building when added together indicate the height of the building.

Many new and neat designs may be drawn by the use of my invention and for this reason it will be of particular use to designers of any kind. Also it will be a very interesting and instructive tool for use by children or adults who like to draw.

While I have herein set forth a certain preferred embodiment of my invention it is understood that I may vary from the same in minor structural details, not departing from the spirit of the invention and within the scope of the appended claims.

I claim:

1. In a device of the kind described, a circular protractor plate having a plurality of concentric scales, an elongated arm, a tubular rivet pivotally connecting the said arm to the center of the protractor plate, the said arm having a longitudinal slot and having scales upon its margins, the said arm also having numerals overlying the said scales upon the protractor plate and indicating the divisions in these scales, a carrier slidably mounted on the arm, the said carrier having a marker receiving aperture, an indicator slide slidably mounted on the arm, an indicating wire medially and longitudinally secured in the slot in the arm over the said scales upon the protractor plate, the said protractor plate having diametrically opposite apertures for the reception of a supporting means, and the said arm having an aperture in its free end for the reception of a sighting means.

2. In a device of the kind described, a circular protractor plate having a plurality of concentric scales, an arm pivotally attached to the said protractor plate, the said arm having a longitudinal slot and having scales upon its margins, the said arm also carrying indicia correlative to the said scales upon the protractor plate, a carrier slidably mounted on the arm, the said carrier having means to receive a marking device, an indicating slide slidably mounted on the arm and an indicating wire operatively positioned in the slot in the said arm over the scales upon the protractor plate.

In testimony wherof I affix my signature.

ROY JONES ETHRIDGE.